Figure 1:
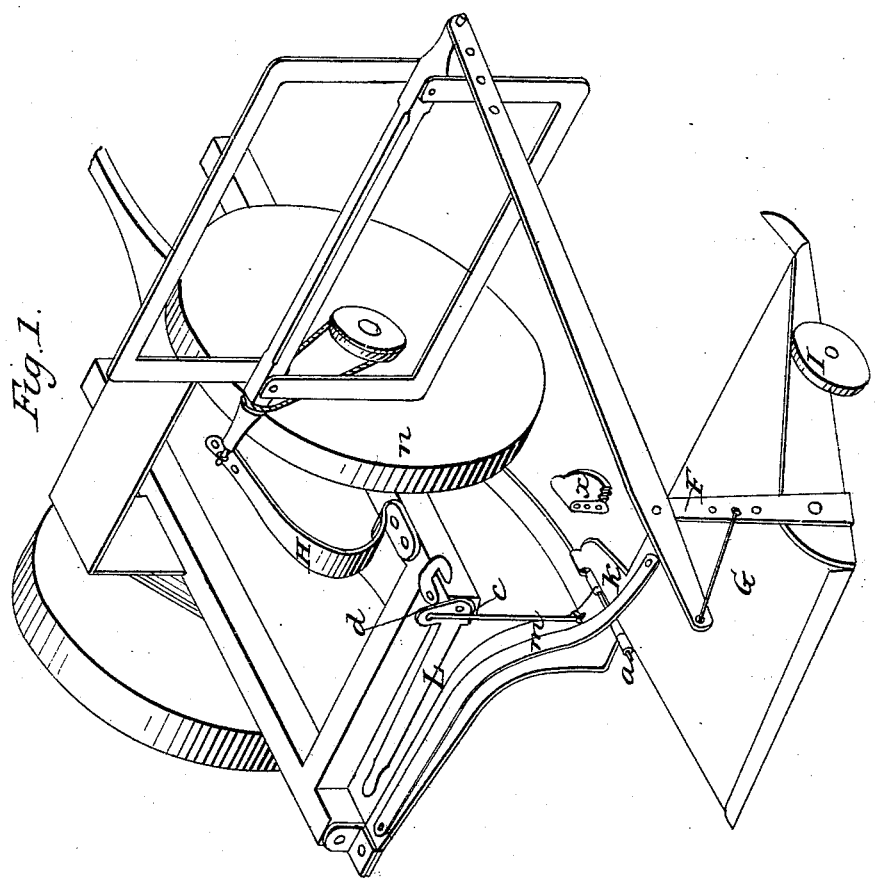

M. G. HUBBARD.
Grain and Grass Harvester.

No. 22,251. Patented Dec. 7, 1858.

Inventor;

M. G. Hubbard

UNITED STATES PATENT OFFICE.

M. G. HUBBARD, OF PENN YAN, NEW YORK.

IMPROVEMENT IN GRAIN AND GRASS HARVESTERS.

Specification forming part of Letters Patent No. 22,251, dated December 7, 1858.

*To all whom it may concern:*

Be it known that I, M. G. HUBBARD, of Penn Yan, Yates county, New York, have invented certain new and useful Improvements in Grain and Grass Harvesters; and I do hereby declare that the following is a full, clear, and exact description thereof, reference being had to the accompanying drawing, illustrative thereof.

The improvements herein described are intended to adapt my well-known two-wheeled mowing-machine to the purposes of reaping grain on uneven surfaces and delivering the same at the side of the swath in gavels ready for binding, and also to attain great ease in altering the machine to accomplish the different purposes of harvesting grain and grass.

I have found it desirable to cut a wider swath in grain than in grass, and I therefore construct the reaper attachment considerably wider than the mowing cutting apparatus, and arrange a distinct cutting apparatus less perfectly made but similar in its proportions on the front of the reaping attachment, thus duplicating the part of the machine which is the first to wear out, and greatly increasing the effective power and durability of the machine by only a trifling addition to its cost; but in order to render such an arrangement practicable in the hands of inexperienced persons it becomes necessary to reduce the process of changing the machine to the greatest possible degree of simplicity. I have therefore divided the "spring wear-plate" and "inner shoe" described in Letters Patent issued to me February 9, 1858, and I construct the said wear-plate with hinge-ears projecting out therefrom, and I construct the inner shoe with corresponding hinge-ears projecting up, and which match the hinge-ears projecting out from the said "wear-plate," and which form a hinge when connected by the hinge-pin $a$, as seen in Figure 1.

On the front corner of the reaping attachment I form hinge-ears, which will match the hinge-ears projecting out from the aforesaid wear-plate, so that for reaping the projecting end of the mower-bar may readily be removed and the reaping attachment readily attached by the hinge aforesaid. The front hinge-ear on the reaping attachment is sufficiently deep for several holes, one above another, (in the drawing this is shown detached at $x$,) so that at any height of the platform the proper level may be maintained by placing the hinge-pin in the proper hole in the said front hinge-ear on the reaper attachment. By this arrangement I attain the greatest possible simplicity in changing the machine and maintaining the proper level of the platform at different heights, and at the same time add to the merits of the machine in many important respects.

The platform, being supported at its outer end on the adjustable wheel I, and at its inner end by the hinge K, is so independent as to conform to uneven surfaces, and it is located back of the machine, so as to admit of a side delivery of the gavels, and in such a position that it can be raised or lowered by the raker (who sits on the rear end of the machine) to cut at any desired height by adjusting the height of the outer supporting-wheel, I, and by the raising-lever L. I find that this raising-lever requires to be of peculiar construction and location for greater convenience, which may be described as follows: I make it of any convenient length —say three feet long—with a short arm projecting out from the end, where it is pivoted to the main frame, as seen at $c$. This short arm projects at an angle slightly less than a right angle, and has a rod (or hook and chain) hinged in its extreme end at $d$, and extending down to the part of the machine to be raised, so that when sustaining the platform a straight line extending from the lower point of attachment up to the hinge $d$ shall fall slightly within the fulcrum-pivot $c$, and thereby render the lever self-sustaining; and after many experiments in the location of this lever I find it most convenient to pivot it to the outer rear corner of the machine at $c$, so that it will work crosswise, (or at right angles with the machine,) by which means, although the cutting apparatus is located at the rear end of the machine, it can always be operated from the rear of the cutters, while if it were so located as to work forward and back (or parallel with the machine) it would sometimes require the operator to step forward of the cutters to operate it, which would be very dangerous. I also find that the ordinary reel is often required in reaping, and that on rough ground the machine is made to operate much more perfectly by so hanging the reel that it will accommodate itself to any unusual position of the machine and platform. To accomplish this I attach the ordinary outer reel-arm to the outer rear corner of the platform by the hinge F, which will admit of a free lateral motion of the reel-arm, and I sustain the said arm by the hinged adjustable brace G, which admits of the lateral motion of the reel-arm, and by which its vertical position may be adjusted. It will thus be seen that when the outer end of the platform is raised the front end of the outer reel-arm will relatively move out, and vice versa, and therefore the said arm would not be strained laterally; but the rising and falling of the outer end of the reel prevent the perfect action of the reel-band by which the reel is rotated, and to overcome this difficulty I either support the inner end of the reel on the arm H, which is elastic vertically, so that it will always keep the band tight while conforming to the varying positions of the reel in reaping over uneven surfaces, or instead thereof I sometimes use an elastic reel-band.

Another obstacle to the perfect operation of a harvester having the general arrangement for utility and convenience above described I find in the imperfect working of the outer wheel, I. This wheel, being necessarily placed so far back of the driving-wheel, does not rotate freely while turning corners, and tends to scrape and tear up the ground. It being evident that the less weight this wheel has to support the less imperfectly it will operate, I have so far improved its application as to render its use practicable by attaching one end of a spring to the platform and the other end to the machine, as seen at M, so that it will act as an elastic lever to sustain a portion of the outer end of the platform upon the hinge-pin a, and consequently upon the main supporting-wheel N. Thus by supporting a portion of the weight of the outer end of the platform upon the main supporting-wheel N side draft is avoided, and also the wheel I is relieved from so much of the weight of the outer end of the platform as to render its operation sufficiently perfect for all the practical purposes of turning, especially when its tread is made considerably rounding.

Having thus fully described my improvements in harvesters, what I claim, and desire to secure by Letters Patent as my invention, is—

1. The attachment of the front corner of the reaping-platform to the corner of the machine by means of the hinge K, constructed and arranged substantially as and for the purposes set forth.

2. The elastic connection between the reel and driving-power, in combination with the flexible attachment of the outer reel-arm, arranged substantially as and for the purposes described.

3. The employment of the self-sustaining raising-lever, when constructed and arranged as and for the objects specified.

4. Supporting a portion of the weight of the outer end of the platform by means of the spring M or its equivalent, substantially as and for the purposes described.

M. G. HUBBARD.

Witnesses:
  O. WATT,
  S. LEWIS.